June 24, 1941.          H. W. EARL          2,246,670
CONNECTING DEVICE
Filed Aug. 9, 1939

INVENTOR
Harry W. Earl
BY

ATTORNEY

Patented June 24, 1941

2,246,670

UNITED STATES PATENT OFFICE 2,246,670

CONNECTING DEVICE

Harry W. Earl, Oakmont, Pa.

Application August 9, 1939, Serial No. 289,162

3 Claims. (Cl. 287—126)

This invention relates to connectors or couplers for members such as cables, wires, cord extensions and the like, or couplers for industrial buggies or railroad cars and particularly to a detachable connector for electrically or mechanically joining such members.

Connectors of the type to which this invention pertains are well known in the art, and have many and varied uses. In some instances, the connections effected by such connectors may be of a temporary nature and in addition require frequent connection and disconnection.

It is one of the objects of the invention to provide a connector capable of being rapidly and repeatedly actuated to effect connection and disconnection of the separable parts thereof without the use of extraneous tools and wherein the separable parts will not become unduly worn and ineffective through such repeated manipulations thereof.

Another object of the invention is to provide a connector of the foregoing character wherein effective electrical and mechanical bonding of the separable elements thereof are obtained.

A further object is to provide a connector having a pair of mating joint or terminal elements fitting together axially in such a manner that they are locked together by a simple relative twisting movement and released by reversely twisting the same.

Still another object is to provide a connector of generally simplified and improved form, comprising a minimum number of parts of such nature that they can be inexpensively and easily produced, and wherein the connector will be sturdy and rugged in construction.

Figure 1:
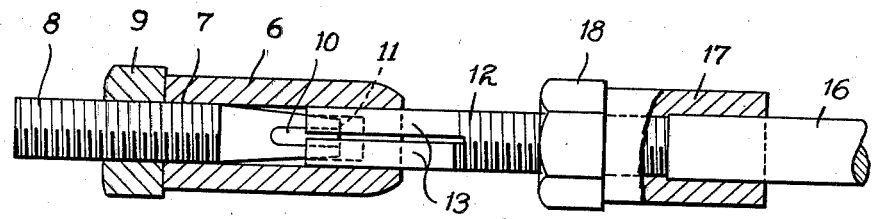
Figure 2:
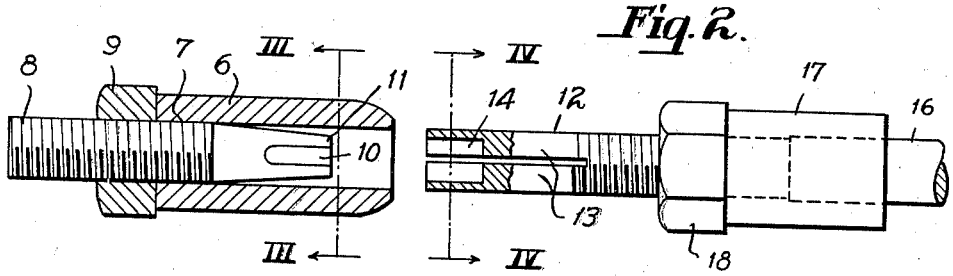
Figure 3:
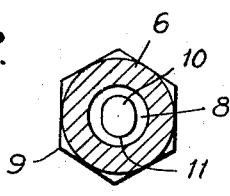
Figure 4:
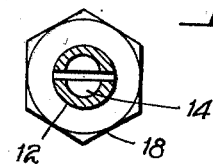
Figure 5:
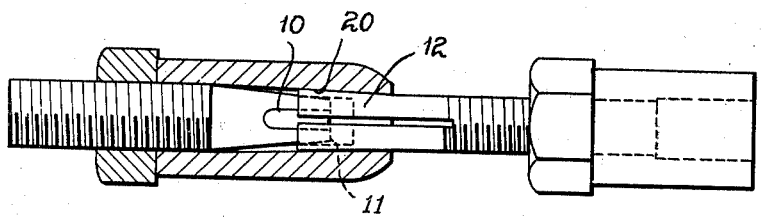
Figure 5:

Various other objects and features of the invention, particularly in the form and construction of the parts, will appear from the detailed description, taken in conjunction with the accompanying drawing, wherein:

Fig. 1 is a side view partly in section of a connector embodying one form of the invention; Fig. 2 is a view similar to Fig. 1, but showing the parts disconnected; Fig. 3 is a sectional view taken on the line III—III of Fig. 2; Fig. 4 is a view taken on the line IV—IV of Fig. 2, and Fig. 5 is a view similar to Fig. 1, but showing a modified form of the invention.

Referring to Figs. 1 to 4, the main body member of the connector or coupler comprises a metallic socket or sleeve 6 which is centrally bored, and at one end is internally screw-threaded, as indicated at 7. A stud 8 is fitted or secured in one end of the socket member in any suitable manner, but preferably the stud 8 is threaded and screwed into the threaded end of the socket member, a jamb nut 9 being provided to lock the stud in position. The inner end of the stud 8 is conically tapered to form a tip portion 10 whose inner end is of reduced diameter relative to the body of the stud. At diametrically opposite points, the end portion of the tip 10 is flattened to oblong shape to form a double expander key or cam 11, for a purpose hereinafter described. The socket 6 requires no external machining while the threads 7 are easily formed therein. The stud 8 can be formed of threaded bar stock and no extreme accuracy is required in forming the tip 10 thereon. The inner end of the stud 8 can be made cylindrical instead of tapered, if desired, and its end provided with a non-cylindrical tip to form an expander key of suitable form.

The socket member 6 is adapted to receive therein a connector pin or stem 12, the socket 6 and the pin 12 forming the separable parts of the connector. One end of the pin 12 is slotted longitudinally, to form a pair of spaced legs 13 and permit expansion of this end of the pin which is slidable axially into the socket member 6. The slotted end of the pin 12 is provided with a recess 14 of sufficient depth for receiving the tip 10 when the pin is slid into the socket. As shown more clearly in Fig. 4, the recess 14 also is non-circular in cross-section, and corresponds in shape to the shape of the tip portion 10, the tip 10 and the recess 14 being substantially of oblong or elliptical form in cross-section. That is, the tip and the recess each has a major and a minor diametral dimension and the tip 10 can only enter the recess 14 when its major dimension is in alignment with the major dimension of the recess.

In connecting the separable parts 6—12 of the connector, they are slipped axially together, the pin and the recess 14 being aligned by relatively twisting the socket 6 and pin 12 so that the tip 10 enters the recess 14 to substantially the position shown in Fig. 1. The tapered surface of the tip portion 10 causes expansion or spreading of the split end of the pin 12 into engagement with the inner wall of the socket 6. Whereupon, the socket 6 and the pin 12 are relatively rotated or twisted slightly and the expander cam on the tip 10 cooperating with the eccentric wall of the recess 14 causes the slotted end of the pin 12 to be expanded and maintained in tight frictional engagement with the wall of the socket 6. Disconnection of the connector is effected by twisting the parts in the opposite direction. The device thus locked will not become unlocked through twisting or whipping of the parts or cables connected thereby.

While a cable or other member 16 may be butt welded or otherwise secured directly to the solid end of the pin 12, a terminal member 17 preferably is provided to which the cable 16 is connected in any suitable manner to obtain effective mechanical and electrical bond therewith. The member 17 is also internally threaded, the solid end of the stem 12 being formed integrally with or suitably secured to the terminal 17 and is shown as being threaded so that it may be screwed into the member 17 and locked in position by a lock nut 18. A similar terminal member with a cable attached may be screwed on the stud 8, and such cables connected and disconnected, as desired, by manipulation of the socket 6 and pin 12 in the manner heretofore described.

Referring now to the structure shown in Fig. 5, the connector is identical to the connector above described except that the central bore of the socket 6 is conically tapered as indicated at 20, the smaller end being disposed at the end of the socket. Upon expansion of the slotted end of the pin 12 by the expander cam 11, the ends of the pin are wedged and positively locked in the socket against axial displacement.

In cases where the connector is employed to carry an electric current, it will be seen that there is positive and effective electrical contact established between the pin 12 and the socket 6 through the extended area of contact therebetween which is established by a wiping action when they are twisted into tight facial contact and become frictionally interlocked by the expander 10. Such wiping action serves to keep the surfaces clean. Additional contact is also established between the expander 10 and the wall of the recess 14. A suitable electrical insulation material such as rubber may be applied to the exterior surfaces of the connector, and such covering will facilitate gripping of the parts to turn them into and out of locking position.

One feature of the invention resides in the interchangeability of the separable parts of the connector, wherein the form of the expander tip and recess 14 make it possible to use the tips of one connector with the sockets of another connector, the results flowing therefrom being obvious. Further, the parts are not subject to excessive or rapid wear and are not easily deranged or damaged in use. The socket 6 and the terminal member 17 may easily be gripped with sufficient force to effect relative rotation thereof to lock the pin and socket together, and since the parts are moved through only a very small range, little time is required to manipulate the connector.

Various changes and modifications can be made in the details and arrangement of the embodiments of the invention illustrated, without departing from the spirit of the invention or the scope of the appended claims and it is to be understood that equivalents for the specific elements disclosed in detail hereabove not otherwise limited by the prior art are intended to be embraced in the claims.

I claim:

1. A connector device of the character described, comprising a body member having a socket formed therein, a radially-expandable terminal member insertable into said socket, a rigid member in said socket for internally engaging said terminal member when inserted into the socket, and means comprising cooperating eccentric surfaces formed on the interengaging surfaces of said terminal member and said rigid member for expanding and maintaining said terminal member in gripping engagement with the inner wall of said socket, said last-named means being operative through relative twisting of said rigid member and said terminal member.

2. A connector of the character described comprising a body member having an axially tapered socket formed therein, a longitudinally slotted terminal pin insertable into said socket through its smaller end, said pin having a non-circular recess formed in the slotted end thereof, and an expander key of non-circular cross-section disposed in said socket in position to be received in said recess for expanding the slotted end of said pin into wedging engagement with the tapered inner wall of said socket through relative twisting of said terminal pin and said body member.

3. In a pin and socket connector for cables and the like, a terminal pin, an internally tapered socket member for receiving said pin, the end portion of said pin being inserted into said socket through its smaller end and being split longitudinally, a tapered plug cooperating internally with said split end of said pin to effect radial expansion thereof into binding engagement with the tapered wall of said socket, and eccentric means formed on the contiguous surfaces of said tapered plug and said pin and operative upon relative rotation of said pin and socket to apply additional expansive force to said pin and to hold said pin in expanded position.

HARRY W. EARL.